United States Patent
Hwang et al.

(10) Patent No.: US 9,590,932 B2
(45) Date of Patent: Mar. 7, 2017

(54) APPARATUS, METHOD AND COMPUTER READABLE RECORDING MEDIUM FOR SHARING REAL TIME VIDEO THROUGH CHATTING WINDOW OF MESSENGER SERVICE

(71) Applicant: NAVER CORPORATION, Seongnam-Si, Gyeonggi-Do (KR)

(72) Inventors: Jeong Yong Hwang, Seongnam-si (KR); Jeanie Jung, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 425 days.

(21) Appl. No.: 14/161,884

(22) Filed: Jan. 23, 2014

(65) Prior Publication Data
US 2014/0214986 A1     Jul. 31, 2014

(30) Foreign Application Priority Data

Jan. 28, 2013    (KR) .................. 10-2013-0009015

(51) Int. Cl.
*G06F 15/16*      (2006.01)
*H04L 12/58*      (2006.01)
(Continued)

(52) U.S. Cl.
CPC ........ *H04L 51/046* (2013.01); *H04L 12/1822* (2013.01); *G06F 15/16* (2013.01); *H04L 41/22* (2013.01)

(58) Field of Classification Search
None
See application file for complete search history.

(56) References Cited

U.S. PATENT DOCUMENTS 8,495,142 B2 *   7/2013   Shaffer ................. H04L 63/08
                                                      709/204
8,626,211 B2 *   1/2014   Yun ....................... H04W 4/14
                                                      345/634
(Continued)

FOREIGN PATENT DOCUMENTS

JP        2004015750 A     1/2004
JP        2007082148 A     3/2007
(Continued)

OTHER PUBLICATIONS

Office Action for corresponding Japanese Application No. 2014-012910 dated Jan. 27, 2015.

(Continued)

*Primary Examiner* — Viet Vu
*Assistant Examiner* — James Edwards
(74) *Attorney, Agent, or Firm* — Harness, Dickey & Pierce, P.L.C.

(57) ABSTRACT

A method of sharing video through a chatting window of a messenger service includes generating a chatting window according to a request to create the chatting window. The request to create the chatting window is received from one of a plurality of chatting window participants. The chatting window includes a first portion where messages are to be displayed and a second portion where video is to be displayed. The first portion is allocated according to the request to generate the chatting window. A request to share video is received by at least one of the plurality of chatting window participants. The second portion is allocated according to the request to share video. The video is provided by displaying the video in the second portion, where at least one of the chatting window participants accessing the video via the second portion.

24 Claims, 8 Drawing Sheets

(51) Int. Cl.
*H04L 12/18* (2006.01)
*H04L 12/24* (2006.01)

(56) References Cited

U.S. PATENT DOCUMENTS

| | | | | |
|---|---|---|---|---|
| 8,831,196 B2* | 9/2014 | Moyers | ................ | G06Q 10/10 370/352 |
| 2008/0297589 A1* | 12/2008 | Kurtz | .................... | H04N 7/147 348/14.16 |
| 2008/0298571 A1* | 12/2008 | Kurtz | .................... | H04N 7/142 379/156 |
| 2010/0037151 A1* | 2/2010 | Ackerman | ............ | G06Q 10/10 715/753 |
| 2010/0107088 A1* | 4/2010 | Hunt | ...................... | G06Q 10/10 715/752 |
| 2010/0179988 A1* | 7/2010 | Nomura | ............. | H04L 12/5895 709/203 |
| 2011/0119597 A1* | 5/2011 | Yellamraju | ............... | G06F 3/01 715/753 |
| 2011/0145757 A1* | 6/2011 | Janwari | ................ | G06F 3/0485 715/786 |
| 2011/0271129 A1* | 11/2011 | Flannagan | ......... | H04L 12/1822 713/323 |
| 2012/0060103 A1* | 3/2012 | Arasaki | ................ | G06F 3/0481 715/752 |
| 2012/0284635 A1* | 11/2012 | Sitrick | ................ | G06Q 10/101 715/751 |
| 2013/0325329 A1* | 12/2013 | Gupta | .................... | G01C 21/32 701/450 |
| 2015/0156609 A1* | 6/2015 | Davis | .................... | H04W 4/021 455/457 |

FOREIGN PATENT DOCUMENTS

| | | |
|---|---|---|
| JP | 2007-215016 A | 8/2007 |
| JP | 2009-267999 A | 11/2009 |
| KR | 2003-0022462 A | 3/2003 |
| KR | 2003-0072844 A | 9/2003 |
| KR | 10-2009-0039897 A | 4/2009 |
| KR | 10-2009-0085990 A | 8/2009 |
| KR | 2009-0131493 A | 12/2009 |
| KR | 2010-0095205 A | 8/2010 |
| WO | WO-2013/008866 A1 | 1/2013 |

OTHER PUBLICATIONS

Japanese Office Action mailed on Dec. 1, 2015 to corresponding Japanese Application No. 2014-012910.
Korean Office Action dated Jul. 20, 2016 for corresponding Korean Patent Application No. 10-2013-0009015.
Internet postings URL: http://blog.naver.com/zjalxm/80176878560 and English abstract.

* cited by examiner

APPARATUS, METHOD AND COMPUTER READABLE RECORDING MEDIUM FOR SHARING REAL TIME VIDEO THROUGH CHATTING WINDOW OF MESSENGER SERVICE

CROSS-REFERENCE TO RELATED APPLICATIONS

This application claims priority to and the benefit of Korean Patent Application No. 10-2013-0009015 filed in the Korean Intellectual Property Office on Jan. 28, 2013, the entire contents of which are incorporated herein by reference.

TECHNICAL FIELD

The example embodiments relate to a messenger service, and more particularly, to an apparatus, a method, and a computer readable recording medium for sharing a video in real time through a chatting window of a messenger service in which a video that is captured by a user is shared in real time through a chatting window of a messenger service.

BACKGROUND

The internet is a global system of interconnected computers. Generally, the Internet is an open type network which is configured to allow most users to freely connect and communicate with other users. The internet also allows users to connect with a computer of another party, which may be accessed most places in the whole world, by applying a common protocol called TCP/IP. Internet users may transmit multimedia information as compressed files using a compression technique in addition to transmission of basic text information to provide various services such as an electronic mail (e-mail) service, a file sharing service, video and/or audio streaming services, and/or other like services.

The usage of the Internet is sharply increased not only domestically but also worldwide so that an importance of the Internet is rapidly increased as a strategic tool for enhancing efficiency and productivity over many fields of existing industries. Further, new business opportunities utilizing the Internet are rapidly being created. The creation of new business models and the extending of existing industries are causing service providers, which use the internet, to gradually increase.

Recently, users perform communications via the internet using a homepage, e-mail, or a phone auto response service (ARS). However, the homepage and e-mail services have a disadvantage in the view point of real time communication with a client. In contrast, the phone ARS has an advantage in the view point of a real time property but has a disadvantage in that a high communication cost for the user is incurred.

In contrast, as a useful method for real time transmission of information using the Internet, there is an instant messenger service (or alternatively, a "messenger service"). A purpose of the messenger service is to transmit a simple message between users in real time. By using the messenger service, two users communicate with each other in real time through a transmitted text as if the users directly communicate with each other. This is because the messenger service gives an importance on a real time property of the message so as to immediately transmit input contents.

Such messenger services typically use a messenger client program, which provides not only a function of simply transmitting a message but also a function of transmitting emoticon, flashcon, gifticon, and the like, to another party of the conversation through a messenger conversion window, or transmitting a file through a conversation window.

The messenger client program also provides not only one to one conversation but also a group conversation function through which multiple people may chat through one conversation window. In order to perform group conversation, a plurality of conversation parties are selected for conversation to create a group conversation window, or a conversation party is added to an already existing conversation window in the messenger client program.

Additionally, the messenger service provides various types of extended services beyond a simple chatting function.

For example, as a technique regarding a method of creating a group chatting room, Patent Document 1 (Korean Patent Application Laid-Open No. 2010-0095205, entitled "System for Providing Chatting" and applied by THINKPOOL CO., LTD.) discloses a chatting system which may interwork with a stock trading system to automatically create a chatting room for every stock item for at least one item even when a user does not request to create a chatting room. Patent Document 2 (Korean Patent Application Laid-Open No. 2009-0131493, entitled "Real-Time Search Word Chatting Room Provision Method Which Uses the Internet" and applied by Min Ho Choi) discloses a configuration which when there are users who input same search words, provides a chatting window between similar users by forming a chatting room between the users.

Patent Document 3 (Korean Patent Application Laid-Open No. 2003-0022462, entitled "Method for Chatting with Desiring Person Using E-Mail" and applied by Bong Rae Park) and Patent Document 4 (Korean Patent Application Laid-Open No. 2003-0072844, entitled "Method for Using E-Mail to Drive Persons to Chat" and applied by Bong Rae Park) disclose a configuration in which an e-mail is transmitted to a party who wants to chat using an e-mail and the other party who receives the e-mail provides a chatting service between a user who transmits the e-mail and the user who receives the e-mail using the received e-mail.

In the meantime, contents which have a difficulty in expression through a text are transmitted as an image, a photograph, or a moving image in the mobile messenger so that more efficient communication is performed. However, a photograph or a moving image (e.g., a video) file which has been already stored in a user terminal may be transmitted through a file attaching function in the chatting window, but a video which is captured in real time in a mobile terminal such as a smart phone and/or a tablet PC cannot be transmitted.

SUMMARY

At least one example embodiment relates to a messenger server.

According to one example embodiment, a messenger server comprises a processor including a messenger processing module and a real time video processing module. The messenger processing module is configured to generate a chatting window according to a request to create a chatting window. The request to create the chatting window may be received from at least one of a plurality of chatting window participants. The plurality of chatting window participants includes a user terminal and at least one other user terminal. The messenger processing module is configured to allocate a first portion of the chatting window to display messages according to the request to create the chatting window. The messenger processing module is configured to allocate a second portion of the chatting window to display video according to a request to share video. The request to share video is received from at least one of the plurality of chatting window participants. The messenger processing module is configured to provide a message for input to the chatting window by at least one of the plurality of chatting window participants in the first portion. The real time video processing module is configured to receive a video according to the request to share video, where the video is to be broadcasted by the at least one of the plurality of chatting window participants sending the request to share video. The real time video processing module is configured to provide the video to at least one of the plurality of chatting window participants.

Example embodiments provide that the real time video processing module includes a real time video control unit configured to manage a broadcasting authority of the chatting window. The broadcasting authority indicates whether at least one of the plurality of chatting window participants is authorized to broadcast video in the chatting window. The real time video control unit is configured to control the video broadcasting according to the broadcasting authority.

Example embodiments provide that the real time video control unit is configured to determine that at least one of the plurality of chatting window participants currently has the broadcasting authority, and transfer the broadcasting authority to at least one other of the plurality of chatting window participants by consent of the chatting window participant currently having the broadcasting authority.

Example embodiments provide that the processor includes a real time video automatically storing unit that is configured to transmit the video to a cloud server to be stored in the cloud server.

Example embodiments provide that the processor includes a positional information receiving unit configured to receive position information of the at least one of the plurality of chatting window participants that is to broadcast the video. The processor may also include a meta information storing unit configured to store meta information associated with the video.

Example embodiments provide that the processor includes a tracking information providing unit configured to provide tracking information in the chatting window. The tracking information is based on the received position information.

Example embodiments provide that in the providing, the tracking information providing unit is further configured to provide the tracking information in a form of at least one of an electronic map, text data, audio data, and image data.

Example embodiments provide that the processor includes a point of interest (POI) information providing unit configured to provide POI information based on the received position information, the POI information indicating points of interest within a desired distance from the received position information.

Example embodiments provide that the processor includes a navigational information providing unit configured to generate a route based on a position of one of the plurality of chatting window participants requesting navigation information and the at least one of the plurality of chatting window participants that is broadcasting the video.

Example embodiments provide that the navigational information providing unit is further configured to provide the route in a form of turn-by-turn directions, the turn-by-turn directions being in a form of at least one of an electronic map, text data, audio data, and image data.

Example embodiments provide that the messenger processing module is further configured to provide a new broadcasting screen to the chatting window in response to a new request to share video received from one of the plurality of chatting window participants. The new broadcasting screen displays another video that is to be captured by the one of the plurality of chatting window participants from which the new request to share video is received.

At least one example embodiment relates to a method of sharing video through a chatting window of a messenger service.

According to one example embodiment, a method of sharing video through a chatting window of a messenger service includes generating a chatting window according to a request to create the chatting window. The request to create the chatting window being received from one of a plurality of chatting window participants. The chatting window includes a first portion where messages are to be displayed and a second portion where video is to be displayed. The first portion may be allocated according to the request to generate the chatting window. The method includes providing a message that is input through the chatting window in the first portion. The method includes receiving a request to share video by at least one of the plurality of chatting window participants. The second portion may be allocated according to the request to share video. The method includes providing the video by displaying the video in the second portion. At least one of the chatting window participants may access the video via the second portion.

Example embodiments provide that the chatting window includes a third portion where another video is to be displayed, and the method further includes receiving another request to share video from another one of the plurality of chatting window participants. The method further includes providing the other video by displaying the other video in the third portion, at least one of the chatting window participants accessing the video via the third portion.

Example embodiments provide that the method further includes managing a broadcasting authority of the chatting window. The broadcasting authority indicates whether at least one of the plurality of chatting window participants is authorized to broadcast video in the chatting window. The method further includes controlling a broadcasting of the video according to the broadcasting authority.

Example embodiments provide that the method further includes determining that at least one of the plurality of chatting window participants currently has the broadcasting authority, and transferring the broadcasting authority to another one of the plurality of chatting window participants by consent of the at least one of the plurality of chatting window participants currently having the broadcasting authority.

Example embodiments provide that the method further includes transmitting the video to a cloud server to be stored in the cloud server.

Example embodiments provide that the method further includes searching for the stored video in the cloud server via the chatting window, and providing the stored video by displaying the stored video in the first portion of the chatting window.

Example embodiments provide that the method further includes receiving position information of the one of the plurality of chatting window participants that is to broadcast the video, and storing meta information associated with the broadcasted video.

Example embodiments provide that the method further includes providing tracking information in the chatting window, the tracking information being based on the received position information.

Example embodiments provide that the providing further includes providing the tracking information in a form of at least one of an electronic map, text data, audio data, and image data.

Example embodiments provide that the method may further include providing point of interest (POI) information based on the received position information, the POI information indicating points of interest within a desired distance from the received position information.

Example embodiments provide that the method may further include generating a route based on a position of one of the plurality of chatting window participants requesting navigation information and the at least one of the plurality of chatting window participants that is to broadcast the video.

Example embodiments provide that the method may further include providing the route in the chatting window, the route being provided in a form of turn-by-turn directions, the turn-by-turn directions being in a form of at least one of an electronic map, text data, audio data, and image data.

Example embodiments provide that the method may further include providing a new broadcasting screen to the chatting window in response to a new request to share video received from one of the plurality of chatting window participants, the new broadcasting screen displaying another video that is to be captured by the one of the plurality of chatting window participants from which the new request to share video is received.

Example embodiments provide that a non-transitory computer readable recording media stores program code that, when executed, performs a function of the one or more example embodiments as described above.

DETAILED DESCRIPTION

Figure 1:
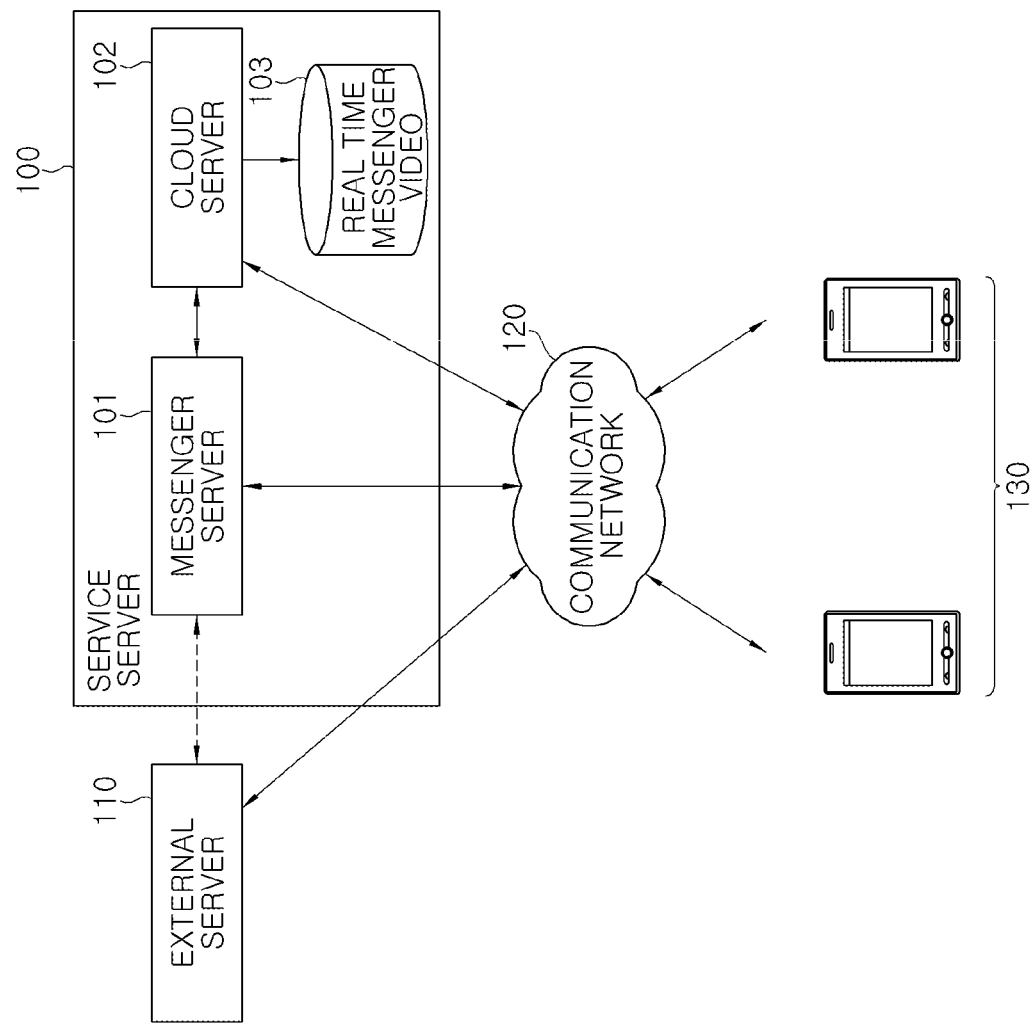
FIG. 1 is a diagram illustrating a real time video sharing system through a chatting window of a messenger service according to an example embodiment.

The example embodiments will be described in detail with reference to the accompanying drawings based on specific embodiments in which the present invention may be carried out as an example. The exemplary embodiments will be described in detail enough to carry out the present invention by those skilled in the art. It should be understood that various example embodiments are different from each other, but need not to be mutually exclusive. For example, a specific figure, a structure, and a characteristic described herein may be implemented as another embodiment without departing from a spirit and a scope of the instant disclosure in relation to an exemplary embodiment. Further, it should be understood that a position or a displacement of an individual constituent element in each disclosed embodiment may be changed without departing from the spirit and the scope of the instant disclosure. Accordingly, the detailed description below is not taken as a limited meaning, and is defined only by the accompanying claims together with all equivalent scopes to the claims if the scope of the present invention is appropriately described. Like reference numerals in the drawing denote the same or similar functions throughout several aspects.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sessions, these elements, components, areas, layers and/or sessions should not be limited by these terms. These terms are only used to distinguish one element, component, area, layer or session from another element, component, area, layer or session. Thus, a first element, component, area, layer or session discussed below could be termed a second element, component, area, layer or session without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sessional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The example embodiments relate to a real time video sharing device and/or system through a chatting window of a messenger service to share a real time video, which is captured by a user through a chatting window of a messenger service. For example, example embodiments provide a function of broadcasting a video which is captured in a user terminal (e.g., a smart phone, a tablet personal computer (PC), a desktop PC, a laptop, a wearable computing device, and the like) in real time in a chatting room such as a mobile messenger.

That is, a real time video transmitting function in a chatting window of a messenger service is provided such that desired content may be transmitted to other participating users (e.g., members in a chatting room) in real time.

According to at least one example embodiment, a real time video transmission by one user is provided, and also a video transmission of multiple users, which are broadcasted by a plurality of users, are provided such that videos by multiple persons may be simultaneously watched.

According to an example embodiment, information (e.g., location information) which may be automatically detected in the user terminal is used to automatically provide meta information related to a video without inputting additional information when a video is provided in real time. For example, if a person who captures the video wants to share a video which is captured in a traveling spot in real time, that is, to show a scenery in a specific location to members in the chatting room, a person who captures the video may automatically transmit the location to the members in the chatting room without inputting additional information.

According to an example embodiment, after broadcasting a video, the broadcasted video is automatically stored in a cloud server so that a user may access the cloud server in a chatting room at any time to watch the video.

According to various embodiments, the messenger service may be driven on a general desktop PC, or may be substantially the same or similarly applied to a mobile messenger service which is driven in a mobile terminal.

The term "user terminal" may be any physical or logical device capable of recording, storing, and/or transferring digital data via a connection to a communications network. A user terminal may be any device that includes a memory and a processor or microprocessor to have an arithmetic ability, such as a mobile communication terminal (e.g., a cell phone, a smart phone, a tablet personal computer (PC), a wearable computing device, and the like), a desktop PC, a notebook PC, a workstation, a palmtop computer, a personal digital assistant (PDA), or a web pad, and/or any other physical or logical device capable of recording, storing, and/or transferring digital data via a connection to a network device. Further, a "user terminal" may be a mobile terminal (e.g., smart phone) which has a function as a camera.

Hereinafter, the exemplary embodiments will be described with reference to the accompanying drawings in detail so that those skilled in the art may easily carry out the example embodiments.

Hereinafter, a structure of a system and an apparatus according to an example embodiment will be described with reference to FIGS. 1 and 2 and then a service procedure according to an example embodiment will be described in detail with reference to FIGS. 3 to 5.

Real-Time Video Sharing System Through Chatting Window of Messenger Service

FIG. 1 is a diagram illustrating a real time video sharing system through a chatting window of a messenger service according to an example embodiment. Referring to FIG. 1, a service provider service server 100 according to an example embodiment, includes a messenger server 101 and a cloud server 102. The cloud server 102 may be embodied so as to interwork with the messenger server 101 as a server which is built by another service provider in the outside of the service server 100.

According to various embodiments, the messenger server 101 and the cloud server 102 may include one or more physical computer hardware systems that are configured to provide services for client devices (e.g., user terminals 130) connected to a network (e.g., communication network 120). messenger server 101 and the cloud server 102 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Messenger server 101 and the cloud server 102 may be configured to establish, manage, and terminate communications sessions, for example between the messenger server 101 and/or the cloud server 102 and one or more of the user terminals 130. Messenger server 101 and the cloud server 102 may also be configured to establish, manage, and terminate communications sessions two or more user terminals.

According to various embodiments, messenger server 101 and the cloud server 102 may be connected to one or more local and/or remote databases (e.g., real time messenger video database 103). In various embodiments, real time messenger video database 103 may include a database management system ("DBMS"). Real time messenger video database 103 may include a relational database management system ("RDBMS") database. In other embodiments, alternate DBMS may also be used, such as an object database ("ODBMS"), column-oriented DBMS, correlation database DBMS, and the like.

The cloud server 102 interworks with the messenger server 101 according to the example embodiment so that a video which is shared in real time through a chatting window of a messenger server is provided from the messenger server 101 to be stored in a real time messenger video database 103. Video data which is stored in the real time messenger video database 103 may be implemented so as to be accessed through the chatting window by a user terminal 130.

According to various embodiments, user terminals 130 may be hardware computing devices capable of communicating with a server, such that each of the user terminals 130 are able to receive services from the server. User terminals 130 may include memory, one or more processors, and transceiver. User terminals 130 may be configured to send/receive data to/from network devices, such as a router, switch, or other like network devices, via a wired or wireless connection. User terminals 130 may be designed to sequentially and automatically carry out a sequence of arithmetic or logical operations; equipped to record/store digital data on a machine readable medium; and transmit and receive digital data via one or more network devices. User terminals 130 may include devices such as desktop computers, laptop computers, cellular phones, tablet personal computers, and/or any other physical or logical device capable of recording, storing, and/or transferring digital data via a connection to a network device. User terminals 130 may include a wireless transceiver configured to operate in accordance with wireless communications standard.

The user terminals 130 may also include a camera module and/or any other like image detection device, which captures a images and/or video. In various embodiments, the camera module may capture images and/or video in real time while the user terminals 130 are moving.

In various embodiments, the user terminals 130 may be equipped with location (or alternatively "geolocation"), positioning, and/or navigation circuitry, such as a Global Positioning System ("GPS") receiver, as well as software to convert the received signals into a location and/or position information (within some margin of error). In other embodiments, alternate positioning systems may be employed, such as wireless network signal-strength-based indoor positioning systems, hybrid systems combining global and local positioning systems, and/or other like positioning and/or location detection systems. However, in various embodiments, geolocation information may come from other sources including an IP address, WiFi and/or Bluetooth MAC address, radio frequency identification ("RFID"), Wi-Fi connection location, GSM/CDMA cell IDs, and the like. In various embodiments, user terminals 130 may use the provided location and/or position information to display graphical maps, text, or other human readable medium of a position and/or location of the user terminals 130. Furthermore, the provided location and/or position information may be used to provide navigation information, such as a route and/or a turn-by-turn navigation directions and/or instructions to a user of a user terminal 130. Such navigation information may be provided to the user by way of an electronic map, text, audio, or a combination thereof.

Each of the user terminals 130 may subscribe and access the service server 100 (that is, messenger server 101) through a communication network 120 and receive a service and also access the messenger server 101 to create a chatting room or join the created chatting room to receive a real time video sharing service through the chatting window.

In the meantime, according to the example embodiment, the messenger server 101 and the cloud server 102 operate to interwork with each other. Further, even though not illustrated in FIG. 1, an authentication server may be used to authenticate each of the user terminals 130 that access the service server 100, in addition to authenticating the user terminals 130 of members who join the chatting through the chatting window of the messenger service in the messenger server 101. The cloud servers 102 in the service server 100 may be operated by the same service provider as described above or operated by separate service providers to interwork with each other.

According to various embodiments, communication network 120 may be any interconnected network of computing devices. The communication network 120 may be configured to operate various communication networks such as a personal area network (PAN), a local area network (LAN), a metropolitan area network (MAN), or a wide area network (WAN). Further, the communication network 120 may be the internet and/or the world wide web (WWW). Communication network 120 may use a wireless transmission technique which is used for a short range communication, such as infrared data association (IrDA) or a Bluetooth.

Figure 6:
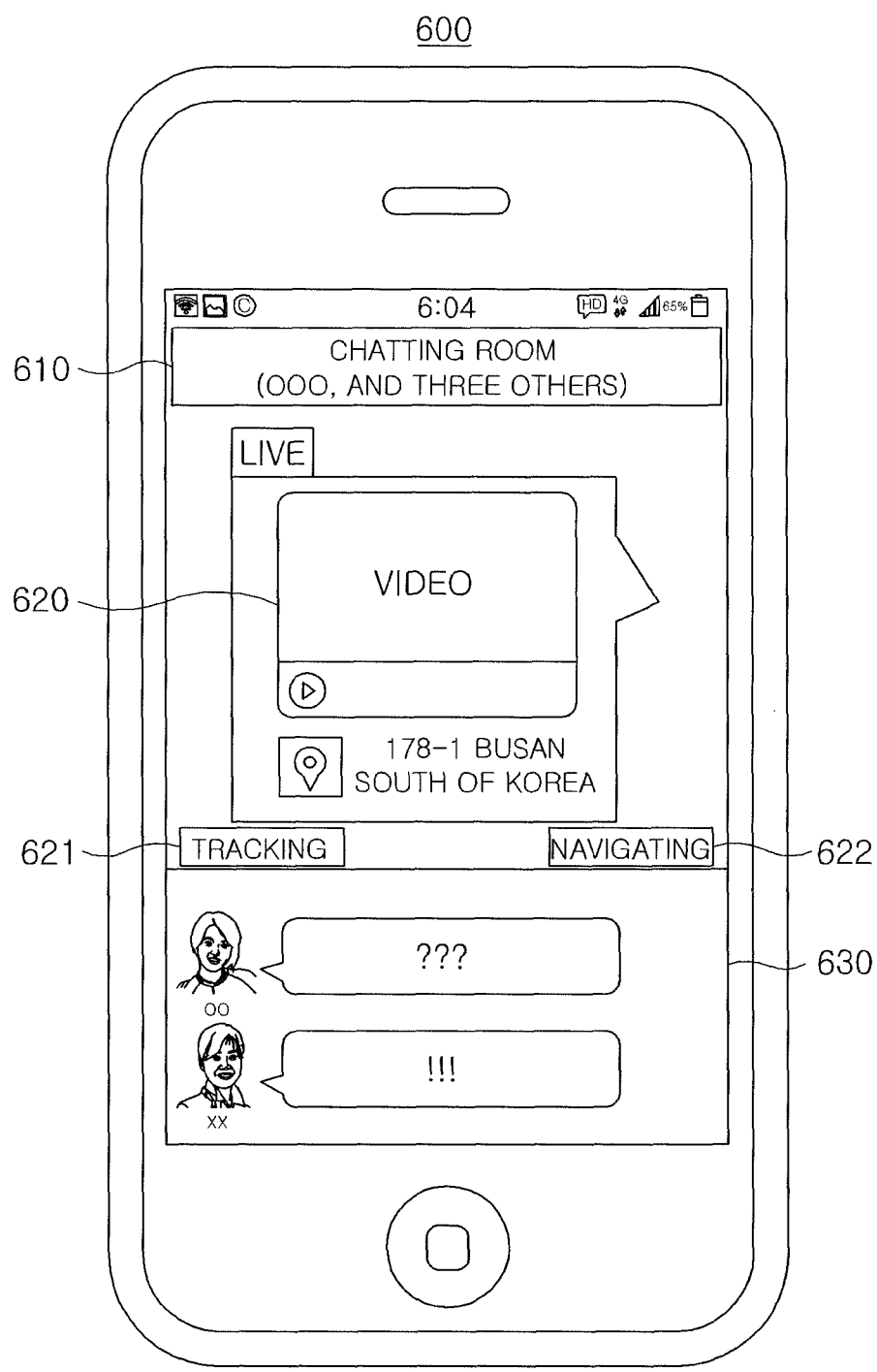
FIG. 6 is a diagram illustrating an example of sharing a video in real time through a chatting window of a messenger service according to an example embodiment.

The user terminals 130 access the messenger server 101 through the user terminals 130 to log in the messenger server 101 and create a chatting room or join the created chatting room and then share a real time captured image through the joining chatting room according to the example embodiment as illustrated in FIG. 6.

That is, the video which is captured in the user terminal 130 is transmitted to the messenger server 101 through the communication network 120, and the messenger server 101 transmits the video which is captured by a user terminal 130 of another member of the chatting room in real time. Therefore, the video which is captured in real time through the chatting window is provided from the user terminal 130 of another member in the same chatting room.

Simultaneously, according to example embodiments, the messenger server 101 transmits the captured video to the cloud server 102 to be stored in the real time messenger video database 103 so that members who join the chatting room later may watch or otherwise display the real time captured video. In such embodiments, the user may watch the stored video by accessing the chatting room.

In the meantime, the messenger server 101 may interwork with an external server 110 and the real time captured image which is shared through the chatting window is provided to the external server 110 to be shared. The external server 110 may be any type of servers and for example, may be a social network service server and a portal site server which provides a blog.

The user terminal 130 according to example embodiments, includes an input/output function for a user who accesses the messenger server 101 through the communication network 120 to create the chatting room or enter the created chatting room and input and check the message through the chatting window. In some embodiments, the user terminals 130 may be provided with a user interface that allows a user to create the chatting room, enter the created chatting room, and/or input and check messages through the chatting window.

As shown in FIG. 1, two user terminals 130, a single service server 100 including a single messenger server 101 and cloud server 102, and a single real time messenger database 103 are present. According to various embodiments, any number of client devices (e.g., user terminals 130), multiple servers (e.g., service server 100 including multiple single messenger servers 101 and/or cloud servers 102, and/or multiple external servers 110), and/or multiple databases (e.g., real time messenger database 103) may be present. Additionally, in some embodiments, the messenger server 101 and the cloud server 102, may be either one physical hardware device or multiple hardware devices. In some embodiments, the messenger server 101 and the cloud server 102 may be virtual machines and/or they may be provided as part of a cloud computing service.

Figure 2:
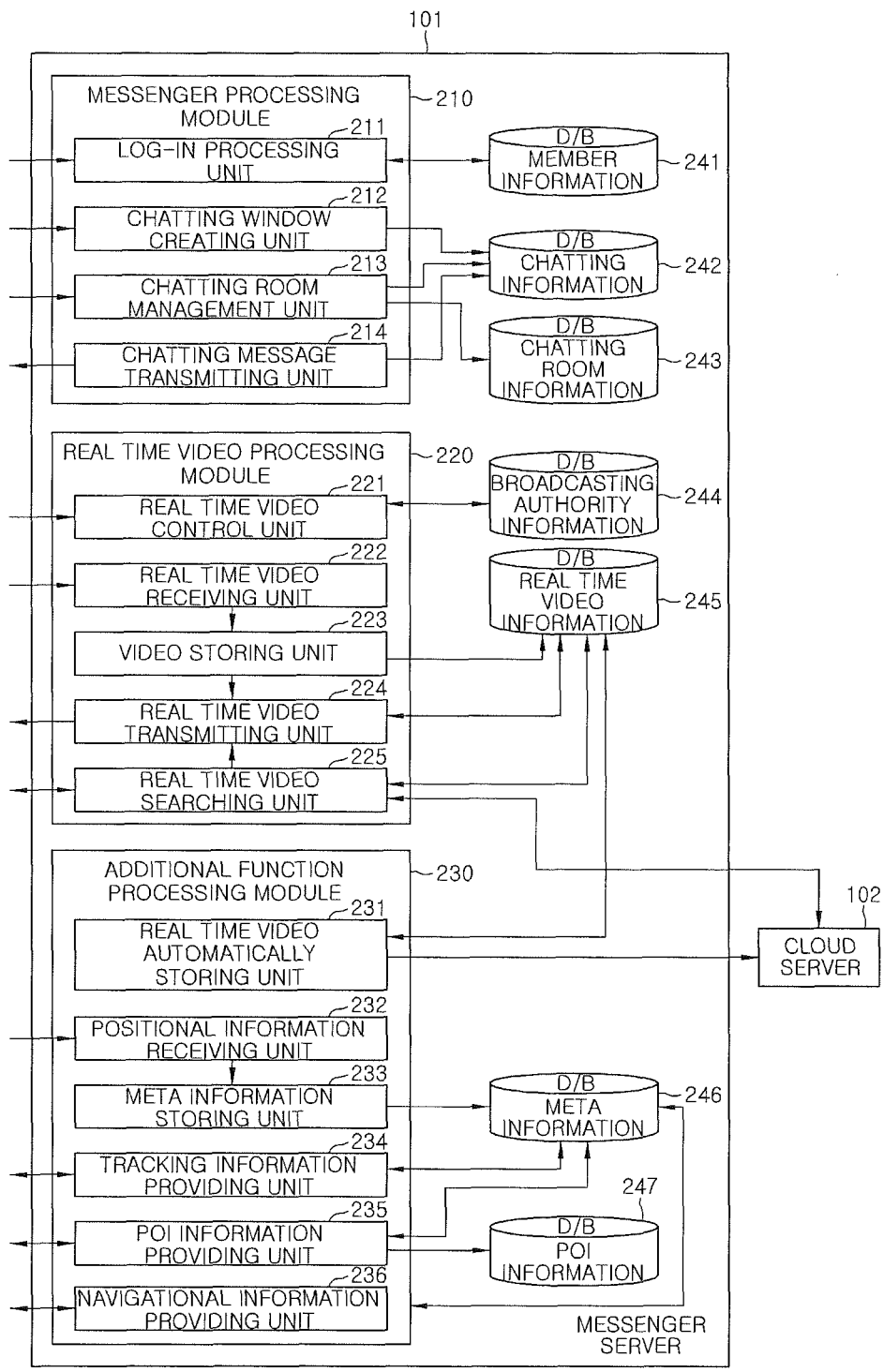
FIG. 2 is a block diagram illustrating a structure of a messenger server according to an example embodiment.

FIG. 2 is a block diagram illustrating a detailed structure of a messenger server 101 according to an example embodiment. Referring to FIG. 2, the messenger server 101 may include a messenger processing module 210 which perform a basic messenger processing function, a real time video processing module 220 which provides a function of sharing the video captured in real time according to the example embodiment through the chatting window of the messenger service, and an additional function processing module 230 which provides various additional functions related with the real time video processing according to example embodiments.

The messenger processing module 210 may include a log-in processing unit 211, a chatting window creating unit 212, a chatting room management unit 213, and a chatting message transmitting unit 214. The real time video processing module 220 may include a real time video control unit 221, a real time video receiving unit 222, a video storing unit 223, a real time video transmitting unit 224, and a real time video searching unit 225. The additional function processing module 230 may include a real time video automatically storing unit 231, a positional information receiving unit 232, a meta information storing unit 233, a tracking information providing unit 234, a point of interest (POI) information providing unit 235, and a navigational information providing unit 236. Additionally, the messenger server 101, may include, or otherwise be associated with a member information database 241, a chatting information database 242, a chatting room information database 243, a broadcast authority information database 244, a real time video information database 245, a meta information database 246, and a POI information database 247.

The various modules, units, and databases may be implemented as computer code that is executed by a processor (not shown) and stored on a storage device. The processor may be configured to carry out instructions of a computer program by performing basic arithmetical, logical, and input/output operations of the system. Instructions may be provided to processor 210 by a computer readable storage medium and/or memory via a bus (not shown), or by network interface via the bus (not shown). The instructions may be embodied by program code that may be stored in a storage device (i.e., memory). Additionally, the above-mentioned software components may also be loaded from a separate computer readable storage medium into the memory using a drive mechanism (not shown).

The memory may be a computer readable storage medium that generally includes a random access memory (RAM), read only memory (ROM), and a permanent mass storage device, such as a disk drive. The messenger server 101 may also be associated with one or more separate computer readable storage mediums, which may include a floppy drive, disc, tape, DVD/CD-ROM drive, memory card, or other like computer readable storage medium (not shown). In some embodiments, software components may be loaded into the memory via a network interface, rather than via a computer readable storage medium.

In the following description, a description and a configuration of general functions of the messenger service will be omitted but a part related with a characteristic of the example embodiments will be described. Further, all or parts of detail functional units which are included in the messenger processing module 210 of the messenger server 101 may be included in a client program which is installed in the user terminal 130, and some or all functions of the detail functional units may interwork with each other or be distributed to be processed by the server and the client system.

First, when a user terminal 130 accesses the messenger server 101 to request to log in the messenger server, the log-in processing unit 211 of the messenger processing module 210 performs a log-in process with reference to information stored in a member information database 214 and may perform authentication by interworking with the authentication server, as described above.

When the user terminal 130 creates a chatting room and requests to create a chatting window after logging in to the messenger server 101, the chatting window creating unit 212 performs a function of generating a chatting window in accordance with a request to create a chatting window. In this case, the chatting information which is input through the chatting window may be stored in the chatting information database 242. The request to create the chatting window may allocate or otherwise indicate one or more portions of the chatting window in which chatting information is to be input, in addition to allocate or otherwise indicate one or more portions of the chatting window in which the inputted chatting information is to be displayed to the other participants of the chatting window. Accordingly, the messenger processing module 210 may then allocate a portion of the chatting window for inputting and/or displaying inputted chatting information according to the request to generate the chatting window.

According to various embodiments, the chatting room management unit 213 performs a function of managing the created chatting room and managing information regarding the chatting room and information on a plurality of members (e.g., a chatting room ID, a member ID, or member information) which joins the created chatting room. Information on each chatting room may be stored in the chatting room information database 243.

According to various embodiments, the chatting message transmitting unit 214 performs a function of receiving a chatting message input through the chatting window from each user terminal 130 to transmit the chatting message to other user terminals 130. The chatting messages which are transmitted through the chatting message transmitting unit 214 are stored in the chatting information database 242.

According to various embodiments, functions of configuration units of the real time video processing module 220 are described as follows. According to example embodiments, when it is desired to share a video which is captured in real time through the chatting window of the messenger service, the real time video control unit 221 performs a function of managing a broadcasting authority for a real time video which is captured in the user terminal 130 and controlling real time video broadcasting. For example, when a specific user from among members who join a chatting room wants to perform real time broadcasting, the real time video control unit 221 gives a broadcasting authority to a corresponding broadcaster and if another user wants to continuously perform the broadcast, the real time video control unit 221 transfers the broadcasting authority by consent of an original broadcaster. In the meantime, information regarding the broadcasting authority for the real time video may be stored in a broadcasting authority information database 244. It should be noted that the broadcast authority feature described above is an optional feature of the example embodiments, and thus in some embodiments, the broadcast authority feature may be disabled or otherwise not included in the chatting window.

In various embodiments, the real time video control unit 221 may manage video sharing by the participants of the chatting window. In some embodiments, one or more chatting participants may request to share video to the messenger server 101. In such embodiments, the request to share video may allocate or otherwise indicate one or more portions of the chatting window in which the video is to be displayed. Accordingly, the messenger processing module 210 may then allocate a portion of the chatting window for displaying the shared video according to the request to share video, and the real time video control unit 221 may then manage the display of the shared video in the portion of the chatting window allocated for the shared video.

According to various embodiments, the real time video receiving unit 222 receives an image which is captured in real time by a specific user who obtains the broadcasting authority. In this case, when a plurality of users obtains the broadcasting authority to provide a plurality of real time broadcasting videos through one chatting window, the real time video receiving unit 222 may receive a plurality of videos which is captured in real time from the respective user terminals 130.

According to various embodiments, the video storing unit 223 performs a function of temporarily storing the video received through the real time video receiving unit 222 in a real time video information database 245. In the meantime, the real time video information, according to example embodiments, may be transmitted to a separate cloud server 102 by the real time video automatically storing unit 231 of the additional function processing module 230 to be stored.

According to various embodiments, the real time video transmitting unit 224 performs a function of checking information of other members of the chatting room in which the user who transmits the real time video joins, and transmits the real time video which is received by user terminals 103 of the other members. Accordingly, in various embodiments, the real time video to be transmitted may be transmitted together with information which distinguishes a chatting room.

After providing the broadcasting of the real time video in the chatting room, if the members who join the chatting room desire to watch and/or display the video at another time, a member may request to search for the broadcasted video. In such embodiments, the real time video searching unit 225 performs a function of searching and providing the real time broadcasting video which is stored in the real time video information database 245 or the cloud server 102, in accordance with the request. In the meantime, the stored real time video information may be implemented to be requested through the chatting room in which the member joins or the chatting window. That is, a broadcasting replay function is selected in the chatting window, the broadcasting video which is broadcasted in real time in the chatting window and stored, is requested again to be watched.

According to various embodiments, functions of configuration units of the additional function processing module 230 are described as follows. The real time video automatically storing unit 231 performs a function of automatically storing a video which is broadcasted in real time in a database by a basic function according to the present invention or a setting of the user, as described above. In this case, the video may be stored in one or more databases associated with the messenger server 101, or the video may be transmitted to the external cloud server 102 to be stored.

According to various embodiments, the positional information receiving unit 232 performs a function of receiving positional information of a user terminal 130, which captures video, so as to provide position information of the captured video when the captured video is broadcasted through the chatting window. That is, when a user joins the chatting and performs real time video broadcasting, position information of the user terminal 130 capturing the broadcasting video is searched in real time to be provided to the messenger server 101. By doing this, the position information receiving unit 232 receives the position information of the user terminal 130 which provides the real time broadcasting video, to check the position where the real time broadcasting video is captured.

According to various embodiments, the meta information storing unit 233 performs a function of storing meta information regarding the real time broadcasting video together with the positional information which is received by the positional information receiving unit 232 in the meta information database 246. The meta information may include an ID of a broadcaster who broadcasts real time captured video, a nick name and/or alias of the broadcaster, a broadcasting starting time, a broadcasting progressing time, a broadcasting position information, a user terminal type, an image capture device type or a camera module type, a video resolution, and/or other like meta information. When the real time broadcasting video is provided through the chatting window of the messenger service, the meta information associated with the broadcaster may be provided to the other members of the chatting room.

Figure 7:
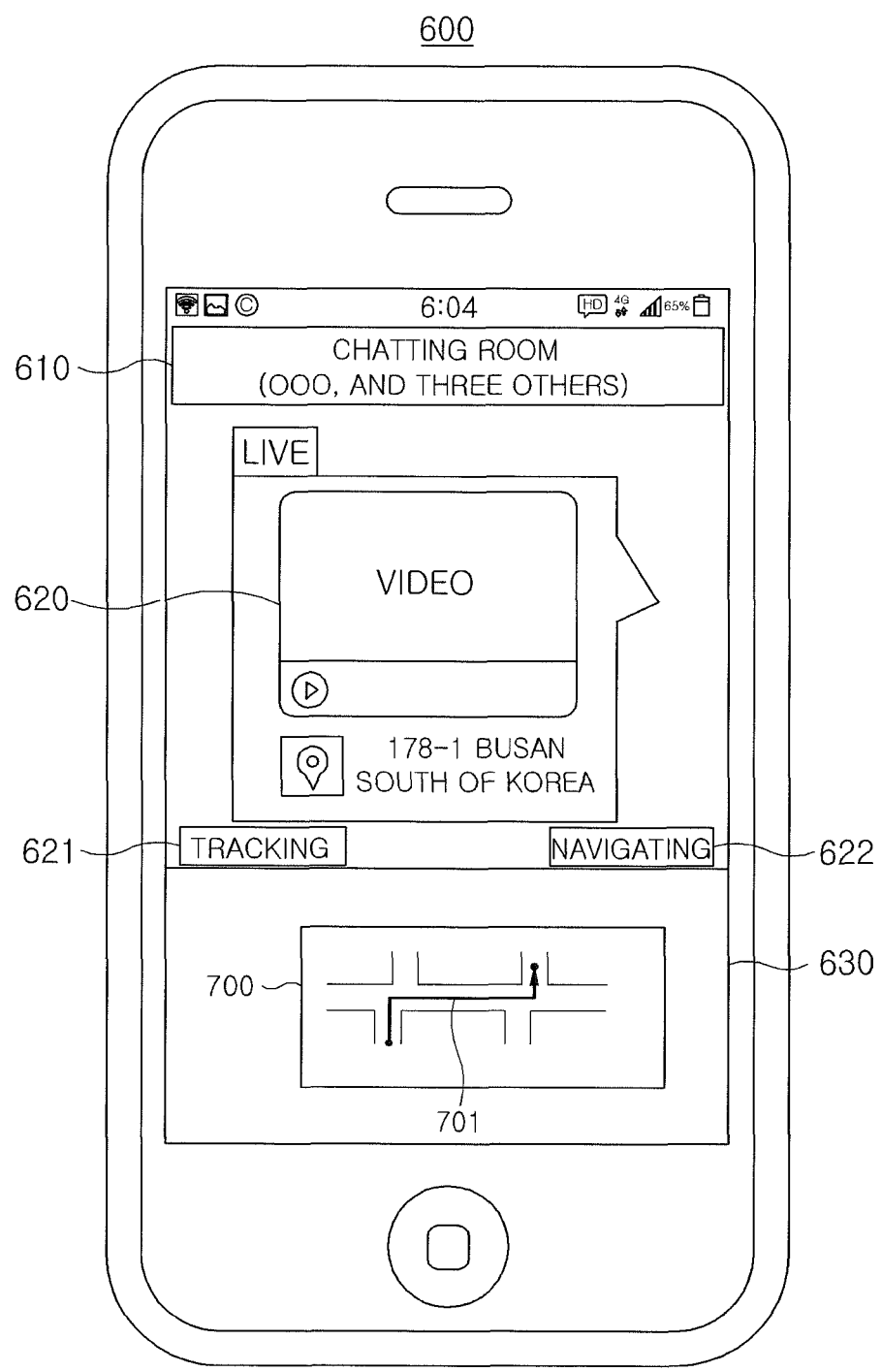
FIG. 7 is a diagram illustrating a video location tracking service screen in a real time video sharing service through a chatting window of a messenger service according to an example embodiment.

In various embodiments, a member who joins the chatting room may request tracking information of the real time captured video being broadcast. In such embodiments, the tracking information providing unit 234 provides the tracking information to be displayed on a map (e.g., as illustrated in FIG. 7). To this end, the tracking information providing unit 234 checks accumulated position information of the captured video which is received at a predetermined interval and stored in the meta information database 246, and displays the information on an electronic map to provide the information to the chatting window of the user terminal 130 (e.g., as illustrated in FIG. 7).

According to various embodiments, the point of interest (POI) information providing unit 235 performs a function of searching the POI information which is included within a desired (or alternatively, "predetermined") distance from the position of the captured image from the POI information database 247, and providing the POI information with reference to the positional information of the captured video which is stored in the meta information database 246. POI information may be any information that is deemed to be important, significant, interesting, or otherwise noteworthy. In many embodiments, the POI information may be associated with position information, such as the position information associated with the broadcaster as described above.

According to various embodiments, when the real time video broadcasting is provided in the chatting window, a member in the chatting room may request a navigating function. The navigational information providing unit 236 performs a function of displaying a route based on a position of the user terminal 130 currently broadcasting the real time captured video. The route may be provided on an electronic map, in text format, or any other type of format.

Figure 8:
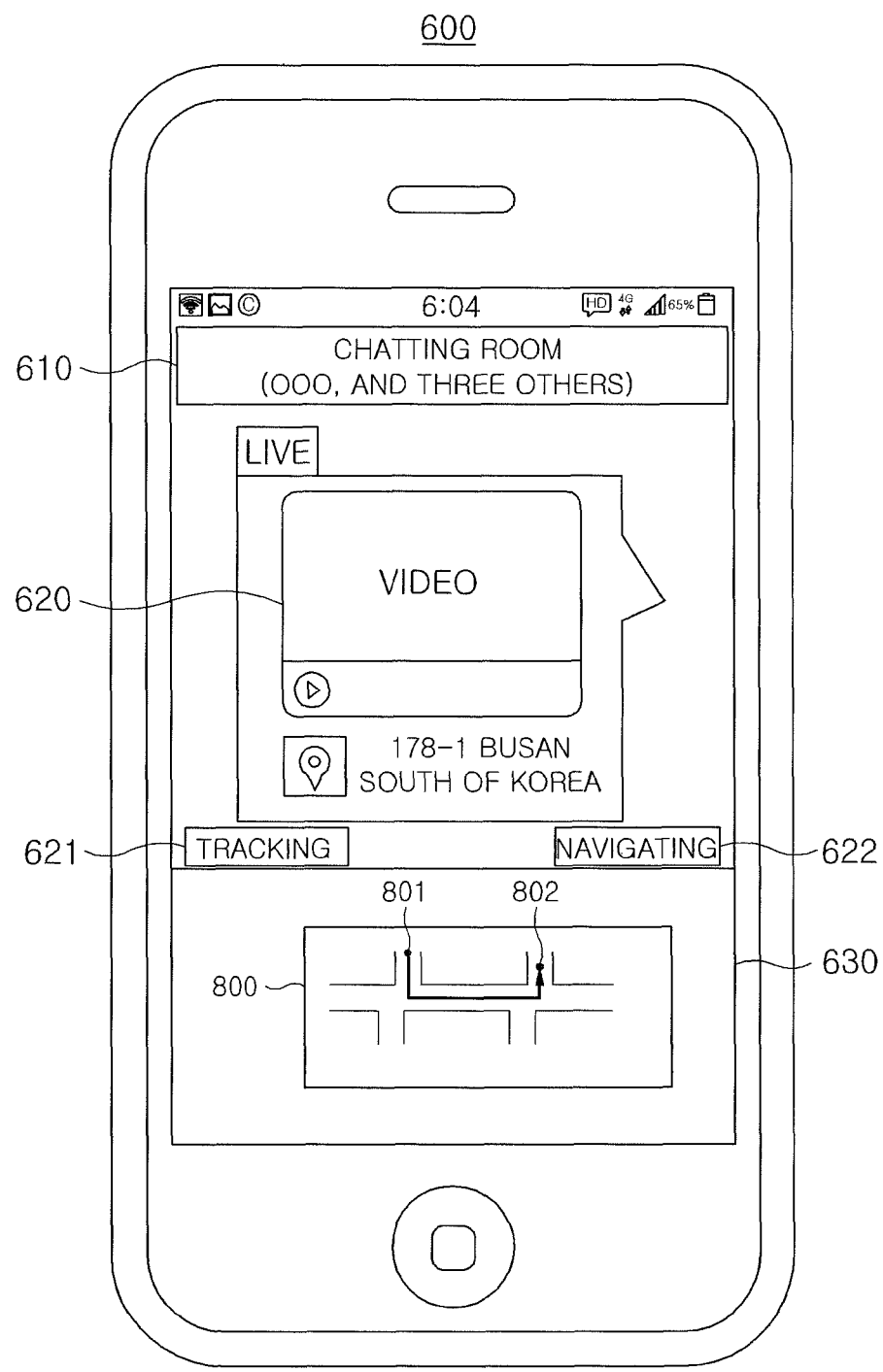
FIG. 8 is a diagram illustrating a navigating service screen in a real time video sharing service through a chatting window of a messenger service according to an example embodiment.

Therefore, during the real time broadcast in the chatting window, if a member wants to go to a position where real time video broadcasting is currently being captured, the member may select the navigating function (e.g., as illustrated in FIG. 8) in order to obtain navigation information directing the member to the position where real time video broadcasting is currently being captured. If the navigating function is selected, the navigational information providing unit 236 receives the position information from the user terminal 130 of the user who selects the navigating function, receives the position information associated with the real time broadcasting video being captured, and determines a route between the two positions. As described above, the route may be displayed on an electronic map, which is provided to the user terminal 130 of the user who selects the navigating function. In various embodiments, the route may be displayed in the chatting window together with the real time broadcasting video (e.g., as illustrated in FIG. 8).

It should be noted that the respective constituent elements of the messenger server 101, as shown in FIG. 2, are separately indicated so as to represent that the respective constituent elements may be functionally and/or logically separated. Example embodiments are not limited thereto, and the respective constituent elements may be implemented as separate constituent elements either physically and/or logically.

The respective functional units (or modules) as described herein may include a functional and/or structural combination of a hardware which carries out a technical spirit of the example embodiments and a software which drives the hardware. For example, those skilled in the art may easily deduct that the functional units may refer to a desired and/or predetermined code or a logical unit of a hardware resource for executing the predetermined code but may not necessarily refer to a physically connected code or one type of hardware.

The various databases as described herein may refer to a functional and structural combination of software and hardware in which information corresponding to the database is stored. The databases may include any type of data storage medium and data structure in which information corresponding to the database is stored.

Real-Time Video Sharing Method Through Chatting Window of Messenger Service

Figure 3:
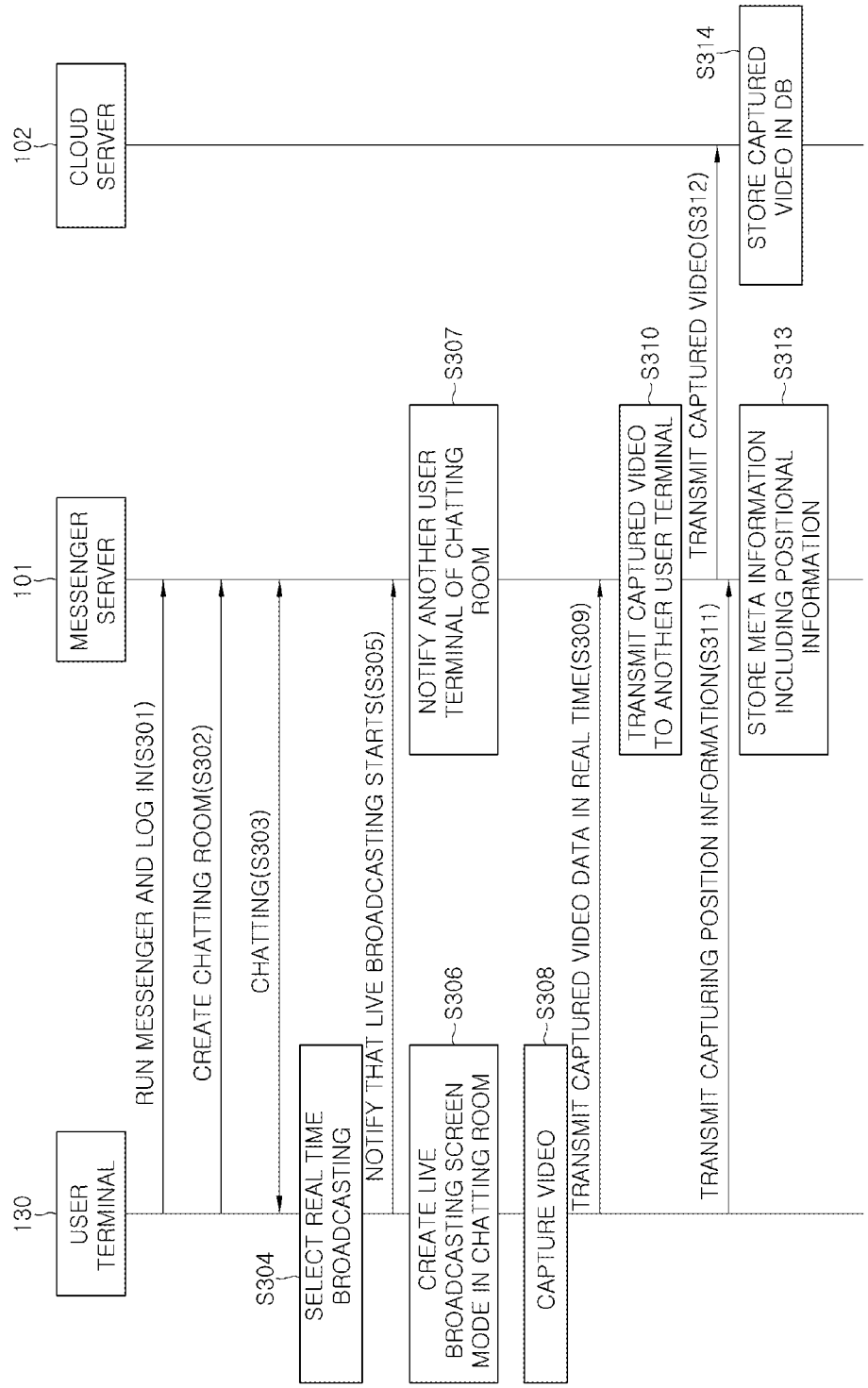
FIG. 3 is a signal flow chart illustrating a real time image sharing process through a chatting window of a messenger service according to an example embodiment.

FIG. 3 is a signal flow chart illustrating a real time image sharing process through a chatting window of a messenger service according to an example embodiment. Referring to FIG. 3, first, in operation S301, a user terminal 130 executes a messenger program to access a messenger server 101 and log in to the messenger server 101. Next, the user terminal creates a new chatting room or joins the created chatting room in operation S302 to perform chatting in step S303. In this case, a user is selected to create a chatting window to create the chatting room. In various embodiments, the creation of the chatting room may include selecting one or more users to join the chatting room or otherwise participate in a chat. In the chatting room, a one to one conversation may be performed or a plurality of users may join the chatting room to perform a conversation among three or more members. Thus, in various embodiments, a user may select one or more users from a contact list to join the chatting room. In some embodiments, users may be associated with one another via a social networking service or other like communication platform, where the social networking service or communication platform may allow users to associate with one another by compiling a contact list, a "friends" list, and the like. In such embodiments, a user creating a chatting room may select one or more other members of the social networking service or communication platform that are listed in the user's contact list or friends list. According to example embodiments, if a real time broadcasting is selected through a chatting window which is displayed on the user terminal 130 in operation S304, an area where the real time broadcasting video is displayed is established in a desired area of the chatting window to create a live broadcasting screen mode in operation S306. A camera module which is provided in the user terminal 130 is then driven to capture a video in operation S308, and the captured image is played and/or displayed in real time in the desired area.

In operation S307, a live broadcasting starting notification is transmitted to the messenger server 101 in response to the real time broadcasting selection, and the messenger server 101 notifies another user terminal 130 in the chatting room that the real time broadcasting starts in response to the real time broadcasting selection.

In operation S309, the video captured by the user terminal 130 which selects the real time broadcasting is transmitted to the messenger server 101 in real time. In operation S310, the messenger server 101 transmits the real time captured video which is transmitted in real time to another user terminal 130 in the chatting room. According to example embodiments, the real time captured video is transmitted to the cloud server 102 in operation S312 and the cloud server 102 stores the real time captured video in a database in operation S314 so that the captured video may be accessed and/or watched later at any time.

According to example embodiments, position information of the user terminal 130 that captures the real time video is transmitted to the messenger server 101 in operation S311 and the messenger server 101 also stores meta information of the captured real time video including the transmitted positional information in operation S313. Additionally, the meta information may be transmitted to another user terminal 130 together with the real time captured video.

Figure 4:
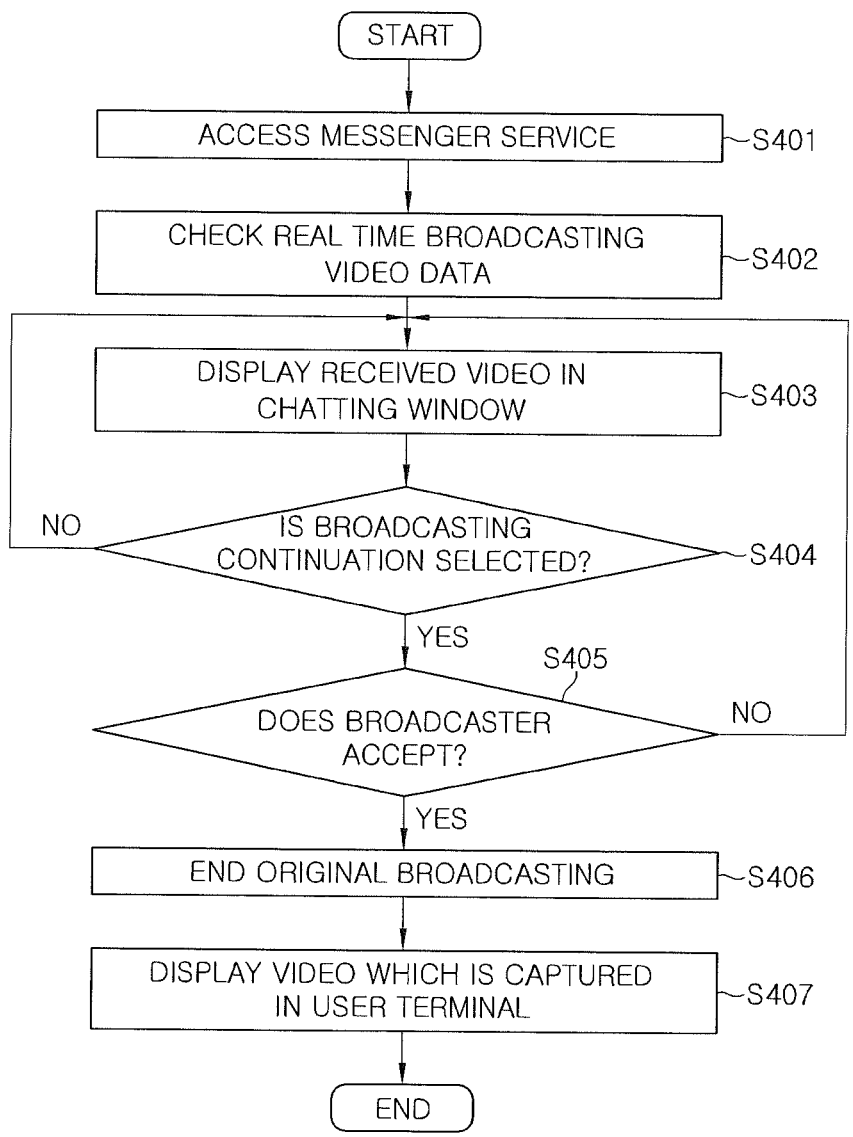
FIG. 4 is a flow chart illustrating a broadcast continuing process in real time image sharing through a chatting window of a messenger service according to an example embodiment.

FIG. 4 is a flow chart illustrating a broadcast continuing process in real time image sharing through a chatting window of a messenger service according to an example embodiment.

In operation S401, a user terminal accesses the messenger service through the user terminal and enters the chatting room. At some point, another member in the chatting room starts real time video broadcasting, and in operation S402, the user terminal receives the real time broadcasting video data and displays the real time broadcasting video data in the chatting window in operation S403.

In this case, if the user desires to perform new real time broadcasting during the real time broadcasting of another member, the user may begin and/or continue the new broadcasting by the consent of the original broadcaster. Therefore, if the broadcasting continuance in the chatting room is selected in operation S404, information on a request of continuing the broadcasting is transmitted to a user terminal of a current broadcaster. If the current broadcaster receives the request of continuing the new broadcasting and accepts the broadcasting continuance in operation S405, the original broadcasting which is currently being broadcasted ends in operation S406 and a video which is captured by a user terminal who selects the broadcasting continuance is displayed in operation S407.

The example embodiment described above allows a plurality of members in a chatting room to continuously broadcast real time captured video.

Figure 5:
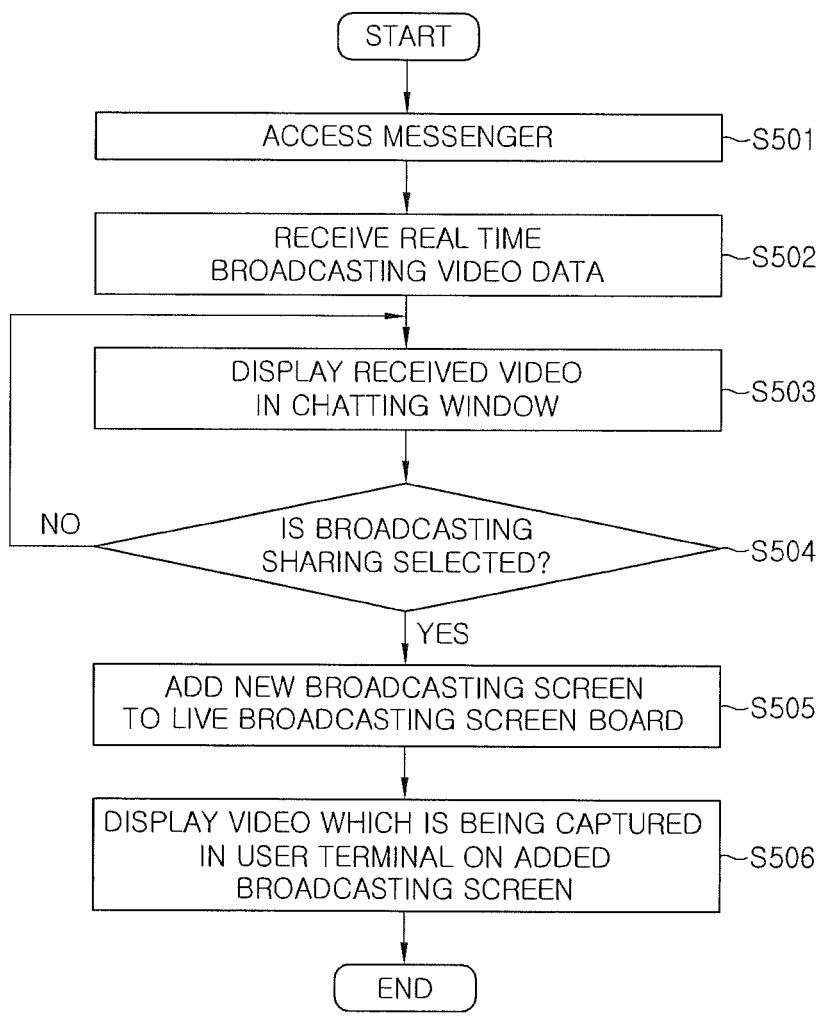
FIG. 5 is a flow chart illustrating a broadcast sharing process in real time image sharing through a chatting window of a messenger service according to an example embodiment.

FIG. 5 is a flow chart illustrating a broadcast sharing process in real time image sharing through a chatting window of a messenger service according to an example embodiment. Referring to FIG. 5, a plurality of chatting members may simultaneously provide real time broadcasting videos in one chatting window, which is different from FIG. 4.

In operation S501, user terminals access the messenger service and enter the chatting room. Then another member in the chatting room may start real time video broadcasting, and in operation S502, the user terminal receives the real time broadcasting video data and displays the video data in the chatting window in operation S503.

In this case, during the real time broadcasting of another member, if a user desires to share the real time video captured by the user, the user may add the broadcasting screen into the chatting window to share the real time video regardless of the consent of the original broadcaster.

Therefore, if the user selects broadcasting sharing in operation S504, a new broadcasting screen is added to a live broadcasting screen board in step S505 and a video which is currently captured in the user terminal is displayed on the added broadcasting screen in step S506. In this case, the broadcasting screen is added so that one broadcasting screen may be resized to have an appropriate size in consideration of overall arrangement and a size of the screen.

The methods according to the example embodiments may be implemented as a program code which may be executed by one more processors of one or more computer devices, where such program codes is recorded in a computer readable medium. The computer readable medium may include solely a program command, a data file, and a data structure or a combination thereof. The program commands recorded in the medium may be specifically designed or constructed for the present invention or known to those skilled in the art of a computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter. The hardware device may operate as one or more software modules in order to perform the operation of the present invention and vice versa.

Exemplary Embodiments

FIG. 6 is a diagram illustrating an example of sharing a video in real time through a chatting window of a messenger service according to an example embodiment. Referring to FIG. 6, according to an example embodiment, a mobile messenger is executed in a smart phone 600 and a real time broadcasting button is selected in a chatting room so that as illustrated in FIG. 6, a live broadcasting screen board 620 is created at an upper portion of a screen of a chatting room 610. As another method, if a live broadcasting screen play is clicked from a speech bubble of a chatting room of a user, a screen is enlarged to provide the real time broadcasting. As described above, as the real time broadcasting is performed, the entire chatting room area is configured to be divided into a real time broadcasting area and a conversation message display area 630. In the meantime, the arrangement and the configuration of the screen may be implemented to vary in accordance with the exemplary embodiment.

In FIG. 6, according to example embodiments, when a tracking button 621 is selected, a tracking function of the video captured position is provided according to the example embodiment, as illustrated in FIG. 7.

FIG. 7 is a diagram illustrating a video location tracking service screen in a real time video sharing service through a chatting window of a messenger service according to an example embodiment. Referring to FIG. 7, accumulated position information of the video captured position information may be displayed as route information 701 on an electronic map 700 as the tracking function is selected in FIG. 6. That is, as illustrated in the drawing, a route from a starting position of the real time broadcasting video to a currently broadcasting position may be displayed on the electronic map.

In FIG. 6, according to example embodiments, when a navigating button 622 is selected, route information from a current position of the user to the video captured position is provided according to the example embodiment, as illustrated in FIG. 8.

FIG. 8 is a diagram illustrating a navigating service screen in a real time video sharing service through a chatting window of a messenger service according to an example embodiment. Referring to FIG. 8, a route is calculated from a position of the current user terminal and the currently video captured positional information as the navigating function is selected in FIG. 6 and the route information may be displayed on the electronic map 800 as route information. Therefore, a position 801 of the current user terminal and a position 802 of a broadcaster (that is, a position where a real time broadcasting video is currently captured) may be displayed on the electronic map 800 as points.

The example embodiments have been described above with a purpose of steps of a method for representing specific functions and a performance of the relationship therebetween. Such boundaries and sequence of functional elements and the method steps have been defined herein for convenience of description. Alternative boundaries and/or sequences may be defined as long as the functions and relationships therebetween are appropriately performed. The alternative boundaries and sequences are therefore within a scope and a spirit of the example embodiments. Further, the boundaries of the functional elements have been defined for convenience of description. As long as some important functions are appropriately performed, alternative boundaries may be defined. Similarly, flow chart blocks may be defined herein so as to represent some important functionalities. For extended usage, the flow chart blocks, the boundaries, and the sequence may be defined and perform some important functions still. Therefore, alternative definitions of the functional elements, flow chart blocks and sequences are within the scope and spirit of the example embodiments.

The example embodiments may be further at least partially described with terminologies of one or more example embodiments. The example embodiments are used herein to represent the aspects, features, concepts, and/or examples thereof. A physical embodiment of an apparatus, a manufactured product, a machine and/or process which embody the example embodiments may include one or more aspects, features, concepts, and examples which have been described with reference to one or more example embodiments described herein. Further, in the drawings, the example embodiments may combine functions, steps, and modules which may use the same or different reference numerals and are identically or similarly designated and the functions, the steps, and the modules may be the same or similar functions, steps, modules or different from those.

The example embodiments have been described by specified matters and limited embodiments and drawings such as specific elements for broader understanding, but the example embodiments are not limited to the example embodiments described above, and those skilled in the art will appreciate that various modifications, additions and substitutions are possible.

The spirit of the example embodiments is defined by the appended claims rather than by the described example embodiments above, and all changes and modifications that fall within metes and bounds of the claims, or equivalents of such metes and bounds are therefore intended to be embraced by the range of the spirit of the present invention.

What is claimed is:

1. A messenger server comprising:
   a memory having computer readable instructions stored thereon; and
   at least one processor configured to execute the computer readable instructions to,
   generate a chatting window according to a request to create a chatting window, the request to create the chatting window being received from at least one of a plurality of chatting window participants, the plurality of chatting window participants including a first mobile user terminal and at least one second mobile user terminal,
   allocate a first portion of the chatting window to display messages according to the request to create the chatting window,
   allocate a second portion of the chatting window to display real-time video according to a request to share video, the request to share video being received from at least one of the plurality of chatting window participants,
   provide a message for input to the chatting window by at least one of the plurality of chatting window participants in the first portion,
   receive a real-time video according to the request to share video, the real-time video is to be broadcasted by the at least one of the plurality of chatting window participants sending the request to share video, the real-time video including automatically generated real-time location information related to the location that the real-time video is captured,
   provide the real-time video to the plurality of chatting window participants, and
   generate a route based on a position of one of the plurality of chatting window participants requesting navigation information and the automatically generated real-time location information of the real-time video.

2. The messenger server of claim 1, wherein the at least one processor is further configured to execute the computer readable instructions to:
   manage a broadcasting authority of the chatting window, the broadcasting authority indicating whether at least one of the plurality of chatting window participants is authorized to broadcast video in the chatting window; and
   control the video broadcasting according to the broadcasting authority.

3. The messenger server of claim 2, wherein the at least one processor is further configured to execute the computer readable instructions to:
   determine that at least one of the plurality of chatting window participants currently has the broadcasting authority; and
   transfer the broadcasting authority to at least one other of the plurality of chatting window participants by consent of the chatting window participant currently having the broadcasting authority.

4. The messenger server of claim 1, wherein the at least one processor is further configured to execute the computer readable instructions to:
   transmit the real-time video to a cloud server to be stored in the cloud server.

5. The messenger server of claim 1, wherein the at least one processor is further configured to execute the computer readable instructions to:
   receive position information of at least one of the plurality of chatting window participants that is to receive the real-time video; and
   store meta information associated with the real-time video.

6. The messenger server of claim 5, wherein the at least one processor is further configured to execute the computer readable instructions to:
   provide tracking information in the chatting window, the tracking information is based on the received position information.

7. The messenger server of claim 6, wherein the providing further includes:
   providing the tracking information in a form of at least one of an electronic map, text data, audio data, and image data.

8. The messenger server of claim 5, wherein the at least one processor is further configured to execute the computer readable instructions to:
   provide POI information based on the received position information, the POI information indicating points of interest within a desired distance from the received position information.

9. The messenger server of claim 5, wherein the at least one processor is further configured to execute the computer readable instructions to:
   generate the route based on received position information of at least two of the plurality of chatting window participants requesting navigation information and the automatically generated real-time location information of the real-time video.

10. The messenger server of claim 9, wherein the at least one processor is further configured to execute the computer readable instructions to:

provide the route in a form of turn-by-turn directions, the turn-by-turn directions being in a form of at least one of an electronic map, text data, audio data, and image data.

11. The messenger server of claim 1, wherein the at least one processor is further configured to execute the computer readable instructions to:
provide a new broadcasting screen to the chatting window in response to a new request to share video received from one of the plurality of chatting window participants, the new broadcasting screen displaying another real-time video that is to be captured by the one of the plurality of chatting window participants from which the new request to share video is received.

12. A method of sharing video through a chatting window of a messenger service, the method comprising:
generating, by a messenger server, a chatting window according to a request to create the chatting window, the request to create the chatting window being received from one of a plurality of chatting window participants, the chatting window including a first portion where messages are to be displayed and a second portion where real-time video is to be displayed, the first portion being allocated according to the request to generate the chatting window;
providing, by the messenger server, a message that is input through the chatting window in the first portion;
receiving, by the messenger server, a request to share video by at least one of the plurality of chatting window participants, the second portion being allocated according to the request to share video;
transmitting, by the messenger server, the real-time video by displaying the real-time video in the second portion, at least one of the chatting window participants accessing the real-time video via the second portion, the real-time video including automatically generated real-time location information related to the location that the real-time video is captured; and
generate a route based on a position of one of the plurality of chatting window participants requesting navigation information and the automatically generated real-time location information of the real-time video.

13. The method of claim 12, further comprising:
managing, by the messenger server, a broadcasting authority of the chatting window, the broadcasting authority indicating whether at least one of the plurality of chatting window participants is authorized to broadcast video in the chatting window; and
controlling, by the messenger server, a broadcasting of the real-time video according to the broadcasting authority.

14. The method of claim 13, further comprising:
determining that at least one of the plurality of chatting window participants currently has the broadcasting authority; and
transferring the broadcasting authority to a second participant of the plurality of chatting window participants by consent of the at least one of the plurality of chatting window participants currently having the broadcasting authority.

15. The method of claim 12, further comprising:
transmitting, by the messenger server, the real-time video to a cloud server to be stored in the cloud server.

16. The method of claim 15, further comprising:
searching, by the messenger server, for the stored video in the cloud server via the chatting window; and providing, by the messenger server, the stored video by displaying the stored video in the first portion of the chatting window.

17. The method of claim 12, further comprising:
receiving, by the messenger server, position information of at least one of the plurality of chatting window participants that is to receive the real-time video; and
storing, by the messenger server, meta information associated with the broadcasted video.

18. The method of claim 17, further comprising:
providing, by the messenger server, tracking information in the chatting window, the tracking information being based on the received position information.

19. The method of claim 18, wherein the providing further comprises:
providing, by the messenger server, the tracking information in a form of at least one of an electronic map, text data, audio data, and image data.

20. The method of claim 17, further comprising:
providing, by the messenger server, point of interest (POI) information based on the received position information, the POI information indicating points of interest within a desired distance from the received position information.

21. The method of claim 17, further comprising:
generating the route based on the received position information of at least two of the plurality of chatting window participants requesting navigation information and the automatically generated real-time location information of the real-time video.

22. The method of claim 21, further comprising:
providing, by the messenger server, the route in the chatting window, the route being provided in a form of turn-by-turn directions, the turn-by-turn directions being in a form of at least one of an electronic map, text data, audio data, and image data.

23. The method of claim 12, further comprising:
providing a new broadcasting screen to the chatting window in response to a new request to share video received from one of the plurality of chatting window participants, the new broadcasting screen displaying another real-time video that is captured by the one of the plurality of chatting window participants from which the new request to share video is received.

24. A non-transitory computer readable recording media storing computer readable instructions, which when executed, causes at least one processor to:
generate a chatting window according to a request to create the chatting window, the request to create the chatting window being received from one of a plurality of chatting window participants, the chatting window including a first portion where messages are to be displayed and a second portion where real-time video is to be displayed, the first portion being allocated according to the request to generate the chatting window;
provide a message that is input through the chatting window in the first portion;
receive a request to share video by at least one of the plurality of chatting window participants, the second portion being allocated according to the request to share video;
transmit the real-time video by displaying the real-time video in the second portion, at least one of the chatting window participants accessing the real-time video via the second portion, the real-time video including automatically generated real-time location information related to the location that the real-time video is captured; and generate a route based on a position of one of the plurality of chatting window participants requesting navigation information and the real-time video based on the automatically generated real-time location information of the real-time video.

\* \* \* \* \*